(12) United States Patent
Yoshimura et al.

(10) Patent No.: US 7,317,056 B2
(45) Date of Patent: Jan. 8, 2008

(54) SYNTHETIC RESIN EMULSION, EASILY WATER-SWELLABLE PRESSURE-SENSITIVE ADHESIVE COMPOSITIONS CONTAINING THE SAME AND PROCESS FOR PRODUCTION OF THE EMULSION

(75) Inventors: Nobuyoshi Yoshimura, Shizuoka (JP); Yuji Moriya, Fukuroi (JP)

(73) Assignee: Celanese International Corporation, Dallas, TX (US)

( * ) Notice: Subject to any disclaimer, the term of this patent is extended or adjusted under 35 U.S.C. 154(b) by 383 days.

(21) Appl. No.: 10/500,422

(22) PCT Filed: Dec. 27, 2002

(86) PCT No.: PCT/JP02/13859

§ 371 (c)(1),
(2), (4) Date: Jun. 25, 2004

(87) PCT Pub. No.: WO03/057738

PCT Pub. Date: Jul. 17, 2003

(65) Prior Publication Data

US 2005/0090619 A1  Apr. 28, 2005

(30) Foreign Application Priority Data

Dec. 28, 2001  (JP) .............................. 2001-400809

(51) Int. Cl.
*C08F 265/02* (2006.01)
*C08F 2/10* (2006.01)
*C08F 2/22* (2006.01)

(52) U.S. Cl. .................. 526/78; 526/201; 526/902; 524/460; 525/243

(58) Field of Classification Search .................. 526/78, 526/201; 525/902, 243; 524/460
See application file for complete search history.

(56) References Cited

U.S. PATENT DOCUMENTS

| 4,200,563 A | 4/1980 | Komiya ...................... 524/817 |
| 5,081,166 A * | 1/1992 | Kiehlbauch et al. ......... 523/201 |
| 5,670,242 A | 9/1997 | Asano et al. ............. 428/32.24 |
| 6,165,606 A | 12/2000 | Kasahara et al. ........... 428/323 |
| 6,368,707 B1 | 4/2002 | Komiya et al. ............. 428/349 |
| 6,511,736 B1 | 1/2003 | Asano et al. ............... 428/206 |
| 6,517,941 B1 | 2/2003 | Murase ....................... 428/412 |

FOREIGN PATENT DOCUMENTS

| EP | 0 464 454 | 1/1992 |
| EP | 0 472 837 | 3/1992 |
| EP | 0 555 959 A1 | 8/1993 |
| EP | 555959 A1 * | 8/1993 |
| EP | 1 048 479 | 11/2000 |
| EP | 1 114 734 | 7/2001 |
| JP | 49-040388 | 4/1974 |
| JP | 49-046291 | 12/1974 |
| JP | 50-098484 | 8/1975 |
| JP | 52-134658 | 11/1977 |
| JP | 53-126093 | 11/1978 |
| JP | 54-144317 | 11/1979 |
| JP | 55-115419 | 9/1980 |
| JP | 56-028208 | 3/1981 |
| JP | 58-203960 | 11/1983 |
| JP | 62-034947 | 2/1987 |
| JP | 62-104802 | 5/1987 |
| JP | 62-278081 | 12/1987 |
| JP | 04-050204 | 2/1992 |
| JP | 04-053802 | 2/1992 |
| JP | 05-221113 | 8/1993 |
| JP | 07-149038 | 6/1995 |
| JP | 09-169806 | 6/1997 |
| JP | 10-046117 | 2/1998 |
| JP | 10-195276 | 7/1998 |
| JP | 10-217601 | 8/1998 |
| JP | 10-237142 | 9/1998 |
| JP | 2000-118125 | 4/2000 |
| JP | 2000-211248 | 8/2000 |

(Continued)

OTHER PUBLICATIONS

English abstract for publication No. JP 49-040388, Apr. 15, 1974.

(Continued)

*Primary Examiner*—Kelechi C. Egwim
(74) *Attorney, Agent, or Firm*—Michael W. Ferrell

(57) ABSTRACT

There is provided a synthetic resin emulsion comprising polymer particles having a core/shell structure, wherein the shell comprises a copolymer of an unsaturated carboxylic acid and a hydrophilic comonomer, the core comprises a copolymer of a monomer mixture comprising a radically polymerizable main monomer and a radically polymerizable functional monomer, and the monomers constituting the monomer mixture are selected so that the glass transition point (Tg) of the copolymer produced by polymerization is $-20°$ C. or below, and the synthetic resin emulsion has been produced by adding the monomer mixture for core formation and a pH adjustor to an aqueous copolymer solution, which has not been neutralized, produced by polymerizing the unsaturated carboxylic acid and the hydrophilic comonomer in an aqueous medium, and allowing a polymerization reaction to proceed. The use of the synthetic resin emulsion can provide a pressure-sensitive adhesive which has excellent adhesive properties such as adhesive strength, cohesive force and tackiness and can be easily swollen with water without any treatment with an alkali.

6 Claims, No Drawings

FOREIGN PATENT DOCUMENTS

| | | |
|---|---|---|
| JP | 2000-238419 | 9/2000 |
| JP | 2000-313847 | 11/2000 |
| JP | 2000-318306 | 11/2000 |
| JP | 2000-318309 | 11/2000 |
| JP | 2003-003037 | 1/2003 |
| WO | WO 00/23533 | 4/2000 |

OTHER PUBLICATIONS

English abstract for publication No. JP 49-046291, Dec. 9, 1974.
English abstract for publication No. JP 50-098484, Aug. 5, 1975.
English abstract for publication No. JP 52-134658, Nov. 11, 1977.
English abstract for publication No. JP 54-144317, Nov. 10, 1979.
English abstract for publication No. JP 55-115419, Sep. 5, 1980.
English abstract for publication No. JP 56-028208, Mar. 19, 1981.
English abstract for publication No. JP 58-203960, Nov. 28, 1983.
English abstract for publication No. JP 62-034947, Feb. 14, 1987.
English abstract for publication No. JP 62-104802, May 15, 1987.
English abstract for publication No. JP 62-278081, Dec. 2, 1987.
English abstract for publication No. JP 05-221113, Aug. 31, 1993.
English abstract for publication No. JP 07-149038, Jun. 13, 1995.
English abstract for publication No. JP 09-169806, Jun. 30, 1997.
English abstract for publication No. JP 10-195276, Jul. 28, 1998.
English abstract for publication No. JP 10-217601, Aug. 18, 1998.
English abstract for publication No. JP 10-237142, Sep. 8, 1998.
English abstract for publication No. JP 2000-118125, Apr. 25, 2000.
English abstract for publication No. JP 2000-211248, Aug. 2, 2000.
English abstract for publication No. JP 2000-238419, Sep. 5, 2000.
English abstract for publication No. JP 2000-313847, Nov. 14, 2000.
English abstract for publication No. JP 2000-318306, Nov. 21, 2000.
English abstract for publication No. JP 2000-318309, Nov. 21, 2000.
English abstract for publication No. JP 2003-003037, Jan. 8, 2003.

\* cited by examiner

SYNTHETIC RESIN EMULSION, EASILY WATER-SWELLABLE PRESSURE-SENSITIVE ADHESIVE COMPOSITIONS CONTAINING THE SAME AND PROCESS FOR PRODUCTION OF THE EMULSION

BACKGROUND OF THE INVENTION

1. Field of the Invention

The present invention relates to a synthetic resin emulsion for an easily water-swellable pressure-sensitive adhesive, an easily water-swellable pressure-sensitive adhesive composition comprising the same, and a process for producing the synthetic resin emulsion. The easily water-swellable pressure-sensitive adhesive composition is suitable for applications such as labels, tapes, building materials, packaging materials, and electronic materials.

2. Background Art

Elastic bodies such as natural rubbers and synthetic rubbers or acrylic resins have generally hitherto been used as components of pressure-sensitive adhesives. In the formation of pressure-sensitive adhesive labels, sheets, and tapes, these components are applied onto the surface of a support. Such pressure-sensitive adhesive labels, sheets, and tapes can be easily bonded to the surface of an object at room temperature by pressure around a finger pressure and thus have become extensively used in various applications.

For example, these pressure-sensitive adhesive labels, tapes and the like are applied to adherends such as bottles, cans, or plastics. After use, these adherends are often corrected and recycled. The pressure-sensitive adhesive labels and the like applied onto the adherends, however, may become an obstacle to recycling of the adherends in a recycling process.

In some applications, after the pressure-sensitive adhesive label, tape or the like is temporarily used, the label, tape or the like is desired to be removed at once from the adherend. For example, in polishing of the backside of a silicon wafer as an electronic material, a pressure-sensitive adhesive sheet is used for supporting the wafer and protecting a surface pattern. This pressure-sensitive adhesive sheet is separated from the wafer after the polishing of the wafer. In this case, that the pressure-sensitive adhesive does not remain unremoved on the surface pattern is required.

Pressure-sensitive adhesive sheet are also used in sanitary goods. In this application, easy treatment of filth by water washing is required of the pressure-sensitive adhesive sheet.

In recent years, various alkali-swellable pressure-sensitive adhesives in which the pressure-sensitive adhesive can be dispersed or dissolved by alkaline water treatment in the recycling process have been put to practical use. The alkaline water treatment necessary for this treatment of the pressure-sensitive adhesive, however, possibly has an adverse effect on environment. Further, in pressure-sensitive adhesive sheets for electronic materials and sanitary goods, such alkali treatment per se cannot be carried out without difficulties.

For this reason, the development of a pressure-sensitive adhesive, which can easily be separated from the adherend with the aid of water and can be dissolved or dispersed in water without use of any alkali or acid, has been desired. This pressure-sensitive adhesive is preferably an aqueous pressure-sensitive adhesive also from the viewpoint of an environmental problem.

Synthetic resin emulsions produced by polymerizing acrylic monomers or the like in the presence of an emulsifier have hitherto been extensively used as the aqueous pressure-sensitive adhesive. By virtue of a relatively large molecular weight of the polymer, such synthetic resin emulsions can exhibit good water resistance in aqueous pressure-sensitive adhesives. Due to this nature, disadvantageously, the dried film is not easily swollen with water. For this reason, in order to render the polymer in this synthetic resin emulsion swellable with water, it is common practice to use a large amount of a hydrophilic surfactant or to add a water-soluble polymer such as polyvinyl alcohol or cellulose ether.

The use of a large amount of the surfactant sometimes causes plasticization of the polymer with the surfactant and consequently, however, disadvantageously causes a change in adhesive properties with the elapse of time. Further, the use of a large amount of the water-soluble polymer sometimes enhances the viscosity of the pressure-sensitive adhesive, deteriorates the storage stability due to the function of the water-soluble polymer as a coagulating agent, or deteriorates coatability due to structural viscosity.

On the other hand, a method, in which a polymer having a high carboxyl group content produced by solution polymerization is brought to a water-soluble polymer using an aqueous alkaline solution and emulsion polymerization is carried out using the water-soluble polymer as an emulsifier, has also been extensively used.

The polymer thus obtained, however, is swellable with water only under alkaline conditions. Further, in the polymerization process, after solution polymerization, the polymer is brought to an aqueous alkali solution followed by emulsion polymerization. This operation is troublesome. Further, this method suffers from an additional problem that the solvent used in the solution polymerization stays in the synthetic resin emulsion.

Accordingly, the development of a pressure-sensitive adhesive composition, which has excellent basic adhesive properties such as adhesion, cohesive force, and tackiness required of the pressure-sensitive adhesive and, at the same time, can be easily swollen with water without any alkali treatment, has been desired.

SUMMARY OF THE INVENTION

The present inventors have now found that, when a synthetic resin emulsion containing polymer particles having a core/shell structure comprising a shell produced by polymerizing an unsaturated carboxylic acid and a hydrophilic comonomer and a core produced by conducting polymerization in the presence of the shell is used as a main component of a pressure-sensitive adhesive composition, the resultant pressure-sensitive adhesive composition has excellent fundamental adhesive properties and can be easily swollen with water. Further, it was found that, in the preparation of this synthetic resin emulsion, the use of the copolymer solution for the shell, without neutralization, in the next polymerization process for the formation of core copolymer was advantageous. Further, it was found that monomers, which have been selected to provide a polymer having a glass transition point (Tg) of −20° C. or below, can be advantageously used as monomers for polymerization for the formation of the core. The present invention has been made based on such finding.

An object of the present invention is to provide a synthetic resin emulsion that can form a pressure-sensitive adhesive composition which has excellent adhesive properties such as adhesive strength, cohesive force and tackiness and can be easily swollen with water without any treatment with an alkali.

According to one aspect of the present invention, there is provided a synthetic resin emulsion comprising polymer particles having a core/shell structure, wherein said shell comprises a copolymer of an unsaturated carboxylic acid and a hydrophilic comonomer, said core comprises a copolymer of a monomer mixture comprising a radically polymerizable main monomer and a radically polymerizable functional monomer, and said monomers constituting the monomer mixture are selected so that the glass transition point (Tg) of the copolymer produced by polymerization is −20° C. or below, and said synthetic resin emulsion has been produced by adding said monomer mixture for core formation and a pH adjustor to an aqueous copolymer solution, which has not been neutralized, produced by polymerizing the unsaturated carboxylic acid and the hydrophilic comonomer in an aqueous medium, and allowing a polymerization reaction to proceed.

This synthetic resin emulsion is preferably used as a main component of an easily water-swellable pressure-sensitive adhesive composition.

The easily water-swellable pressure-sensitive adhesive composition according to the present invention comprises, as a main component, the above synthetic resin emulsion.

According to another aspect of the present invention, there is provided a process for producing a synthetic resin emulsion comprising polymer particles having a core/shell structure, said shell comprising a copolymer of an unsaturated carboxylic acid and a hydrophilic comonomer, said core comprising a copolymer of a monomer mixture comprising a radically polymerizable main monomer and a radically polymerizable functional monomer, said process comprising the steps of:

providing an unsaturated carboxylic acid and a hydrophilic comonomer; polymerizing them in an aqueous medium to prepare an aqueous copolymer solution; and adding said monomer mixture for core formation and a pH adjustor to the aqueous copolymer solution without the neutralization of the aqueous copolymer solution, allowing an emulsion polymerization reaction to proceed to prepare a synthetic resin emulsion, wherein said monomer mixture comprising monomers selected so that the glass transition point (Tg) of the copolymer produced by polymerization is −20° C. or below.

In the synthetic resin emulsion according to the present invention, the shell in the core/shell structure is considered to function also as an emulsifier. Therefore, good polymerization stability can be provided without the use of a large amount of other surfactant, protective colloid or the like. This can realize the avoidance of use of or reduction of the amount of the surfactant, the protective colloid or the like which is often causative of adverse effect. Further, the pressure-sensitive adhesive composition using the synthetic resin emulsion according to the present invention is excellent in adhesive properties such as adhesive strength, cohesive force, and tackiness, can easily be swollen with water and dispersed or dissolved in water. Therefore, the pressure-sensitive adhesive composition is advantageous in that adherends can easily be recycled and, further, that, when a pressure-sensitive adhesive label or sheet is temporarily used and then separated, the pressure-sensitive adhesive composition remaining unremoved on the surface of the adherend can be easily removed.

DETAILED DESCRIPTION OF THE INVENTION

Synthetic Resin Emulsion

The synthetic resin emulsion according to the present invention is suitably used as a main component of an easily water-swellable pressure-sensitive adhesive composition and contains polymer particles having a core/shell structure. In the present specification, the term "easily water-swellable" refers to a property that, when water is applied to the synthetic resin emulsion, the synthetic resin emulsion can easily be swollen. The expression "polymer particles having a core/shell structure" refers to polymer particles comprising a core part as a center and a shell part which is present so as to cover the core part. In this case, the shell part is not always required to completely cover the core part and embraces the case where the shell part covers a part of the core part.

The synthetic resin emulsion containing polymer particles having a core/shell structure according to the present invention can be produced by first providing an unsaturated carboxylic acid and a hydrophilic comonomer, polymerizing them in an aqueous medium to prepare an aqueous copolymer solution for shell formation, then adding said monomer mixture for core copolymer formation and a pH adjustor to the aqueous copolymer solution without the neutralization of the aqueous copolymer solution, and allowing a polymerization reaction to proceed to prepare a synthetic resin emulsion. The monomer mixture comprises monomers selected so that the glass transition point (Tg) of the copolymer obtained after polymerization is −20° C. or below.

Specifically, in the present invention, the copolymer (water-soluble polymer) as the shell is formed in an early stage of the polymerization and is present as a water-soluble polymer in the polymerization system. The monomer composition, which has been adjusted so that the polymerization of the monomer composition can provide a polymer having a Tg of −20° C. or below, is then added in the presence of the aqueous water-soluble polymer solution, and a polymerization is allowed to proceed. In this case, in the progress of the polymerization, the water-soluble polymer for the formation of the shell is considered to function also as an emulsifier in the polymerization system. Finally, particles having the so-called "core/shell structure" in which the copolymer as the core has been covered with the water-soluble polymer as the shell are formed.

Shell

In the present invention, the shell of the polymer particles having a core/shell structure comprises a copolymer of an unsaturated carboxylic acid with a hydrophilic comonomer. Specifically, the copolymer for the formation of the shell (hereinafter often referred to as "shell polymer") is produced by polymerizing an unsaturated carboxylic acid and a hydrophilic comonomer in an aqueous medium in the presence of a polymerization initiator.

Unsaturated Carboxylic Acid

Unsaturated carboxylic acids usable in the present invention include, for example, acrylic acid, methacrylic acid, itaconic acid, crotonic acid, and maleic acid. In the present invention, acrylic acid or methacrylic acid is preferred, and acrylic acid is particularly preferred. Acrylic acid is highly reactive with other monomer, can stabilize the polymerization and further is also advantageous from the viewpoint of regulating the balance between water solubility and adhesive properties.

In the present invention, the amount of the unsaturated carboxylic acid used is preferably 1 to 50% by weight, more preferably 2 to 30% by weight, based on the whole monomer including the core/shell. When the amount of the unsaturated carboxylic acid used is in the above-defined range, advantageously, the swellability with water is good and sensitivity to water is lowered, and, thus, no significant change in adhesive properties during use in everyday life occurs.

Hydrophilic Comonomer

The hydrophilic comonomer usable in the present invention is suitably a hydrophilic comonomer which is other than the above unsaturated carboxylic acid and has a solubility in 100 g of water that is not less than 2 g. Specific examples of such hydrophilic comonomers include hydroxy esters of (meth)acrylic acid, (meth)acrylic esters having n oxyethylene structures on their side chain, vinylpyrrolidone, vinyl acetate, N-methylolacrylamide, alkoxymethylacrylamide, dimethylaminoethyl methacrylate, diacetoneacrylamide, N-butylacrylamide, acrylamide, methacrylamide, and phosphate group-containing monomers.

In the present invention, the hydrophilic comonomer is preferably a hydroxy ester of (meth)acrylic acid from the viewpoints of copolymerizability with the unsaturated carboxylic acid and easy water swellability. Among others, hydroxyethyl (meth)acrylate is particularly preferred.

In the present invention, the amount of the hydrophilic comonomer used is preferably 1 to 50% by weight, more preferably 3 to 30% by weight, based on the whole monomer including the core/shell. When the amount of the hydrophilic comonomer used is in the above-defined range, advantages can be obtained including that the stability of the polymerization and swellability with water are good, a significant increase in viscosity during polymerization can be avoided, a stable product can be provided, and stable adhesive properties are provided.

Polymerization Initiator

The polymerization initiator used in the polymerization of an unsaturated carboxylic acid and a hydrophilic comonomer in an aqueous medium is not particularly limited, so far as the polymerization initiator is usable in the polymerization in a conventional aqueous system, and a conventional polymerization initiator can be properly selected.

Such polymerization initiators include, for example, those which are radically decomposed thermally or with a reducing material to allow addition polymerization of the monomer to proceed, and examples thereof include water-soluble or oil-soluble persulfates, peroxides, or azobis compounds. Specific examples thereof include potassium persulfate, ammonium persulfate, t-butylhydroperoxide, hydrogen peroxide, and azobisisobutyronitrile (AIBN). They may be used either solely or in a combination of two or more of them.

These polymerization initiators may be, if necessary, used in combination with transition metal ions. Preferred transition metal ions include, for example, ferric sulfate, cupric chloride, or ferric chloride.

The polymerization process of the copolymer for the formation of the shell will be instantiated. In the polymerization for the formation of the copolymer for the shell, an aqueous medium is first charged into a reaction kettle and is then heated, an unsaturated carboxylic acid and a hydrophilic monomer are then added thereto, the mixture is heated, a polymerization initiator is optionally added, and a polymerization reaction is allowed to proceed. This results in the formation of an aqueous solution (an aqueous polymer solution) in which a transparent water-soluble polymer is present in a dissolved or dispersed state in water. Aqueous media usable herein include, for example, water and mixtures of water with alcohols such as ethanol. The aqueous polymer solution is used, without neutralization, in the next step of forming the polymer as the core.

Core

In the present invention, the core of polymer particles having a core/shell structure is a copolymer which is produced from a monomer mixture comprising a radically polymerizable main monomer and a radically polymerizable functional monomer and a glass transition point (Tg) of −20° C. or below. Therefore, monomers constituting the monomer mixture are selected so that the copolymer produced by the polymerization has a Tg of −20° C. or below.

The copolymer for the core (hereinafter often referred to as "core polymer") can be formed by forming the copolymer as the shell as described above, adding the above monomer mixture and, further, a pH adjustor to an aqueous solution of this copolymer without neutralization of the copolymer (that is, in an unneutralized state), and conducting emulsion polymerization.

In the present invention, in such a state that the aqueous solution of the copolymer for shell formation (water-soluble polymer) is in an unneutralized state, the polymerization for the formation of a core polymer in the presence of this copolymer is initiated. The reason why the aqueous copolymer solution is used, without neutralization, in the subsequent step of core formation is that, when the step of neutralization is omitted, pH of the aqueous copolymer (water-soluble polymer) solution can be held in an acidic region, preferably at 7 or less, whereby the polymerization reaction can be allowed to proceed stably. In this case, it is considered that, since only a part of the polymer component is neutralized during polymerization with a pH adjustor added during the emulsion polymerization, only polymerization stability (or only storage stability) can be improved without sacrificing the reactivity of the polymerization system.

The emulsion polymerization for core copolymer formation is preferably carried out immediately after the shell polymer formation. In this case, the water-soluble polymer formed by the first polymerization is not present solely and is partially copolymerized with the core polymer component, and, hence, the water-soluble polymer can be present on a suitable level in the coating after the film formation. As a result, swellability can be further improved.

In the present invention, the monomer used in the formation of the core copolymer may be any monomer without particular limination so far as the monomer is a radically polymerizable unsaturated monomer used in conventional emulsion polymerization. In the present invention, however, typically, a monomer mixture comprising a radically polymerizable main monomer and a radically polymerizale functional monomer is used. The term "radically polymerizable main monomer" as used herein is a monomer which is a main component of the core polymer and is radically polymerizable. The term "radically polymerizable functional monomer" as used herein refers to a functional monomer which can modify the core polymer to impart further function and is radically polymerizable.

Radically Polymerizable Main Monomer

Radically polymerizable main monomers usable in the present invention include, for example, alkyl esters of (meth)acrylic acid, cycloalkyl esters of (meth)acrylic acid, olefins, vinyl esters, and aromatic vinyl compounds.

Specifically, alkyl esters of (meth)acrylic acid or cycloalkyl esters of (meth)acrylic acid as the radically polymerizable main monomer include esters of alkyls having 1 to 12 carbon atoms such as methyl, ethyl, n-butyl, t-butyl, propyl, 2-ethylhexyl, or octyl with (meth)acrylic acid, cyclohexyl acrylate, and cyclohexyl methacrylate. Olefins include ethylene and propylene. Vinyl esters include vinyl acetate, vinyl esters of branched carboxylic acids, and vinyl laurate. Aromatic vinyl compounds include styrene and α-methylstyrene.

In a preferred embodiment of the present invention, the main monomer is an alkyl ester of (meth)acrylic acid, a cycloalkyl ester of (meth)acrylic acid, styrene, or a vinyl ester of a branched carboxylic acid. They may be used solely. Preferably, however, they are used in a combination of two or more of them.

Specifically, a combination of two or more alkyl esters of (meth)acrylic acid, a combination of two or more alkyl esters of (meth)acrylic acid with styrene, and a combination of a vinyl ester of a branched carboxylic acid with an alkyl ester of methacrylic acid are preferred from the viewpoints of weathering resistance, polymerization stability and the like.

In a more preferred embodiment of the present invention, a combination of two or more alkyl esters of (meth)acrylic acid is used as the main monomer. Specifically, a combination of 2-ethylhexyl acrylate/butyl acrylate/methyl methacrylate or a combination of 2-ethylhexyl acrylate/methyl methacrylate is preferred. The reason why the above combination is preferred is that the glass transition point (Tg) of the core copolymer can be regulated to −20° C. or below and various adhesive properties can also be advantageously improved.

In the present invention, the amount of the radically polymerizable main monomer used is preferably 20 to 97% by weight, more preferably 50 to 93% by weight, based on the whole monomer including the core/shell. When the amount of the radically polymerizable main monomer used is more than 20% by weight, satisfactory adhesive properties can be ensured as the pressure-sensitive adhesive composition. On the other hand, when the amount of the radically polymerizable main monomer used is less than 97% by weight, satisfactory water swellability can be achieved because it is possible to prevent the hydrophobicity from being increased to an excessively high level.

Radically Polymerizable Functional Monomer

Radically polymerizable functional monomers usable in the present invention are typically those which can modify synthetic resins to impart storage stability, water resistance, chemical resistance, weathering resistance, adhesion or other properties to the synthetic resins.

Examples of such functional monomers include: ethylenically unsaturated carboxylic acids for improving storage stability and adhesion; the so-called "cross-linkable monomer" having two or more radically polymerizable unsaturated bonds for improving water resistance, weathering resistance, chemical resistance, adhesion and the like; and monomers having on its side chain an alkoxysilyl group, an amide group, a nitrile group, a hydroxyl group, a glycidyl group, a methylol group, a carbonyl group, a quarternary ammonium salt, an ethylene oxide chain, or chlorine.

Specific examples of ethylenically unsaturated carboxylic acids include acrylic acid, methacrylic acid, crotonic acid, and maleic acid.

Crosslinkable monomers having two or more radically polymerizable unsaturated bonds include, for example, divinyl compounds, di(meth)acrylate compounds, tri(meth)acrylate compounds, tetra(meth)acrylate compounds, diallyl compounds, triallyl compounds, and tetraallyl compounds. More specific examples of crosslinkable monomers include divinylbenzene, divinyl adipate, ethylene glycol di(meth)acrylate, diethylene glycol di(meth)acrylate, triethylene glycol di(meth)acrylate, polyethylene glycol di(meth)acrylate, polypropylene glycol di(meth)acrylate, neopentyl glycol di(meth)acrylate, 1,3-butylene glycol di(meth)acrylate, 1,3-butyl di(meth)acrylate, trimethylolethane tri(meth)acrylate, trimethylolpropane tri(meth)acrylate, dipentaerythrit tri(meth)acrylate, diallyl phthalate, triallyl dicyanurate, and tetraallyloxyethane.

Specific examples of other functional monomers include the following monomers.

Monomers having an alkoxysilyl group include vinyltriethoxysilane and 3-methacryloxypropyltriethoxysilane. Monomers having a hydroxyl group include hydroxyethyl methacrylate, hydroxyethyl acrylate, hydroxypropyl methacrylate, hydroxypropyl acrylate, hydroxybutyl methacrylate, and hydroxybutyl acrylate. Monomers having an amide group include acrylamide and methacrylamide. Monomers having a nitrile group include acrylonitrile. Monomers having chlorine on its side chain include vinyl chloride and vinylidene chloride. Monomers having a glycidyl group include glycidyl methacrylate and glycidyl acrylate. Monomers having a methylol group include N-methylolacrylamide. Monomers having a carbonyl group include acetoacetoxyethyl methacrylate.

In the present invention, the functional monomer is preferably an ethylenically unsaturated carboxylic acid. When the ethylenically unsaturated carboxylic acid is used as the functional monomer, by virtue of the presence of the ethylenically unsaturated carboxylic acid, not only the shell copolymer but also the core polymer can be easily swollen with water.

In the present invention, the amount of the unsaturated carboxylic acid used as the functional monomer is preferably 1 to 50% by weight, more preferably 2 to 30% by weight, based on the whole monomer including the core/shell. When the amount of the unsaturated carboxylic acid used is 1% by weight or more, the swellability of the core polymer with water can be maintained. On the other hand, when the amount of the unsaturated carboxylic acid used is 50% by weight or less, the viscosity of the resultant emulsion can be brought to a suitable level and, further, satisfactory adhesive strength can be advantageously provided.

Methods for adding the monomer for forming the core copolymer include a batch polymerization method in which the whole amount of the monomer is added to the reaction kettle at a time, a dropwise addition method in which the monomer is added dropwise, and an emulsion monomer dropwise addition method in which the monomer is emulsified with a surfactant (or an emulsifier) and the emulsion is added dropwise.

In the present invention, the dropwise addition method or the emulsion monomer dropwise addition method is preferably used.

The present invention is characterized in that, in the production of the synthetic resin emulsion, when the monomer for core copolymer formation is added dropwise, the monomer, together with a pH adjustor, is added.

When the pH adjustor is added together with the monomer for core formation, since the pH adjustor is added during polymerization for core polymer formation, partial neutralization can be homogeneously carried out from within the particles. As a result, for the coating after the film formation, the sensitivity to water is higher than that of an unneutralized coating or a post-neutralized coating. As compared with the case where polymerization is carried out after the neutralization of the aqueous copolymer (water-soluble polymer) solution for shell formation, the hydrophilic component is properly incorporated in the polymer without sacrificing the copolymerizability of the shell polymer and the core polymer. Therefore, the swellability of the coating with water, i.e., the sensitivity of the coating to water, can be further improved.

pH adjustors usable in the present invention include, for example, alkali metal salts, ammonia, and amine.

In the present invention, the amount of the pH adjustor used is preferably 1 to 75% by weight, more preferably 3 to 50% by weight, based on the whole unsaturated carboxylic acid including the core/shell. The use of the pH adjustor in an amount of 1% by weight or more is preferred from the viewpoints of neutralizing the unsaturated carboxylic acid and ensuring swellability with water. When the amount of the pH adjustor used is 75% by weight or less, the viscosity of the emulsion after the neutralization can be brought to a suitable level to improve the workability of work using the emulsion and, further, the sensitivity to moisture in the air can be suppressed to stabilize properties during use.

Other Components

In the present invention, the polymerization for core copolymer formation may be carried out in an aqueous medium to which the above monomer mixture and the pH adjustor are added and conventional other components are further added. For example, a surfactant and/or a polymerization initiator can be used as the conventional other component. Further, for example, protective colloids, chain transfer agents, ultraviolet absorbers, and photooxidation inhibitors may also be if necessary used.

In the present invention, the surfactant is one which functions as an auxiliary emulsifier in the emulsion polymerization. Specific examples of surfactants usable in the present invention include conventional anionic, cationic or nonionic surfactants.

More specifically, anionic surfactants include, for example, sodium alkylbenzenesulfonates, sodium alkylsulfonates, and sodium polyoxyethylene alkyl ether sulfonates.

Nonionic surfactants include, for example, polyoxyethylene alkyl ether, polyoxyethylene, and polyoxypropylene glycol surfactants.

Further, in the present invention, radically polymerizable surfactants having at least one radically polymerizable unsaturated groups in their molecule are also usable as the surfactant. The radically polymerizable surfactant is chemically bonded to the polymer component due to the presence of the polymerizable unsaturated bond and is known not to bleed out, as a free surfactant, on the surface of the pressure-sensitive adhesive upon film formation. Therefore, a change in adhesive properties with the elapse of time can be inhibited, and, thus, this surfactant can be favorably used in the present invention.

The radically polymerizable surfactant may be properly selected from conventional materials, for example, anionic and nonionic surfactants. Specific examples thereof include the following compounds 1) to 15):

1) 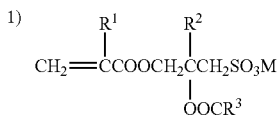

wherein
$R^1$ and $R^2$: H or $CH_3$;
$R^3$: $C_{7-21}$ alkyl or alkenyl group; and
M: alkali metal or ammonium group
(see Japanese Patent Laid-Open Publication No. 144317/1979)

2) 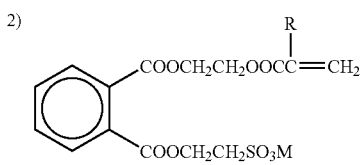

wherein
R: H or $CH_3$; and
M: alkali metal, ammonium group, or amine
(see Japanese Patent Laid-Open Publication No. 115419/1980)

3) 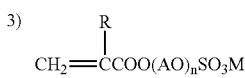

wherein
R: H or $CH_3$;
A: alkylene group;
n: integer of 2 or more; and
M: monovalent or divalent cation
(see Japanese Patent Laid-Open Publication No. 34947/1987)

4) 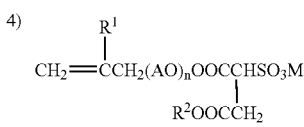

wherein
$R^1$: H or $CH_3$;
$R^2$: unsubstituted or substituted hydrocarbon group or the like;
A: $C_{2-4}$ alkylene group or substituted alkylene group; and
n: 0 or positive number
(see Japanese Patent Publication No. 46291/1974)

-continued

| | | |
|---|---|---|
| 5) | 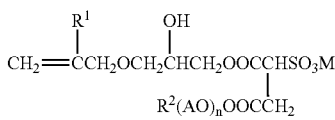 | wherein<br>$R^1$: H or $CH_3$;<br>$R^2$: unsubstituted or substituted hydrocarbon group, amino group or the like;<br>A: $C_{2-4}$ alkylene group;<br>n: 0 to 100; and<br>M: monovalent or divalent cation<br>(see Japanese Patent Laid-Open Publication No. 203960/1983) |
| 6) | 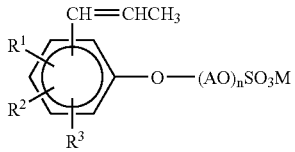 | wherein<br>$R^1$: $C_{6-18}$ alkyl group or the like;<br>$R^2$: H, $C_{6-18}$ alkyl group or the like;<br>$R^3$: H or propenyl group;<br>A: $C_{2-4}$ alkylene group or substituted alkylene group;<br>M: alkali metal or the like; and<br>n: 1 to 200<br>(see Japanese Patent Laid-Open Publication No. 53802/1992) |
| 7) | 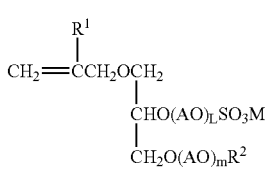 | wherein<br>$R^1$: H or $CH_3$;<br>$R^2$: $C_{8-24}$ hydrocarbon group or the like;<br>A: $C_{2-4}$ alkylene group;<br>M: H, alkali metal, alkaline earth metal, ammonium group or the like;<br>L: 0 to 20; and<br>m: 0 to 50<br>(see Japanese Patent Laid-Open Publication No. 104802/1987) |
| 8) | 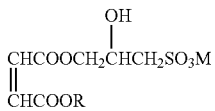 | wherein<br>R: $C_{8-22}$ hydrocarbon group; and<br>M: alkali metal or ammonium group<br>(see Japanese Patent Laid-Open Publication No. 40388/1974) |
| 9) | 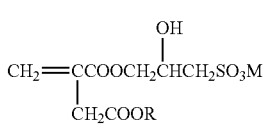 | wherein<br>R: $C_{8-22}$ hydrocarbon group; and<br>M: alkali metal or ammonium group<br>(see Japanese Patent Laid-Open Publication No. 40388/1974) |
| 10) | $\text{CHCOO(AO)}_m\text{R}$<br>$\parallel$<br>$\text{CHCOOM}$ | wherein<br>R: alkyl or alkylphenyl;<br>A: ethylene;<br>M: ammonium, amine, or alkali metal; and<br>m: 9, 12, 14, or 28 (working example)<br>(see Japanese Patent Laid-Open Publication No. 134658/1977) |
| 11) | 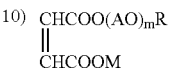 | wherein<br>$R^1$: H or $CH_3$;<br>$R^2$: H, $CH_3$, or $-C_6H_4-(CH_2)_m-H$; and<br>n: 4 to 30<br>(see Japanese Patent Laid-Open Publication No. 126093/1978) |
| 12) |  | wherein<br>$R^1$ and $R^2$: H or $CH_3$;<br>x: 0 to 100;<br>y: 0 to 100;<br>z: 0 to 100; and<br>$1 \leq x + y + z \leq 100$<br>(see Japanese Patent Laid-Open Publication No. 28208/1981) |

-continued

| | |
|---|---|
| 13) 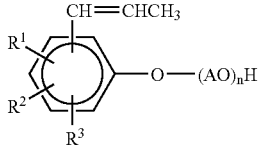 | wherein<br>$R^1$: $C_{6-18}$ alkyl group or the like;<br>$R^2$: H, $C_{6-18}$ alkyl group or the like;<br>$R^3$: H or propenyl group;<br>A: $C_{2-4}$ alkylene group or substituted alkylene group; and<br>n: 1 to 200<br>(see Japanese Patent Laid-Open Publication No. 50204/1992) |
| 14) 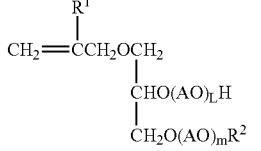 | wherein<br>$R^1$: H or $CH_3$;<br>$R^2$: $C_{8-24}$ hydrocarbon group or acyl group;<br>A: $C_{2-4}$ alkylene group;<br>L: 0 to 100; and<br>m: 0 to 50<br>(see Japanese Patent Laid-Open Publication No. 104802/1987) |
| 15) 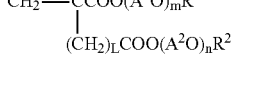 | wherein<br>$R^1$ and $R^2$: H, $C_{1-20}$ hydrocarbon group, or acyl group;<br>$A^1$ and $A^2$: $C_{2-4}$ alkylene group or substituted alkylene group;<br>L: 1 or 2;<br>m and n: 0 or positive number with the proviso that m + n ≧ 3; and when both $R^1$ and $R^2$ are H, m and n ≧ 1<br>(see Japanese Patent Laid-Open Publication No. 98484/1975) |

In an early stage of the polymerization for core polymer formation, the whole amount or at least a part of the surfactant can be added dropwise to the aqueous copolymer solution. Alternatively, a method may be adopted in which the surfactant is previously mixed with the monomer mixture used for core polymer formation to bring the monomer mixture to an emulsion monomer solution which is then added to the aqueous copolymer solution for a polymerization reaction. Further, in the addition of the surfactant, these embodiments for adding the surfactant may be used in combination.

In the present invention, since the water-soluble polymer for shell formation functions as an emulsifier, the surfactant is used an auxiliary emulsifier. Therefore, the amount of the surfactant used is generally smaller than the amount of the surfactant used in conventional emulsion polymerization.

The amount of the surfactant used is preferably about 0 (zero) to 2% by weight based on the whole monomer. When the amount of the surfactant used is 2% by weigh or less, for example, contamination of the adherend caused by bleedout can be prevented.

In the present invention, the polymerization initiator is not particularly limited so far as it can be radically decomposed thermally or with a reducing material to allow addition polymerization of the monomer to proceed, and examples thereof include water-soluble or oil-soluble persulfates, peroxides, or azobis compounds. Specific examples thereof include potassium persulfate, ammonium persulfate, t-butylhydroperoxide, hydrogen peroxide, and azobisisobutyronitrile (AIBN). They may be used either solely or in a combination of two or more of them. Further, these polymerization initiators may be, if necessary, used in combination with transition metal ions. Preferred transition metal ions include, for example, ferric sulfate, cupric chloride, or ferric chloride.

In the present invention, any protective colloid can be used without particular limitation so far as it is a conventional protective colloid usable in emulsion polymerization. Specific examples thereof include polyvinyl alcohol and its derivatives, cellulose ether and its derivatives, and starch derivatives. They are used as an aqueous solution.

The chain transfer agent is not particularly limited and may be properly selected from conventional chain transfer agents, and specific examples thereof include: alcohols, such as methanol, ethanol, propanol, and butanol; acetone, methyl ethyl ketone, cyclohexane, and acetophenone; carboxylic acids having 2 to 8 carbon atoms, such as acetaldehyde, propionaldehyde, n-butylaldehyde, furfural, and benzaldehyde; and mercaptans, such as dodecyl mercaptan, lauryl mercaptan, normal mercaptan, thioglycolic acid, octyl thioglycolate, and thioglycerol. They may be used either solely or in a combination of two or more of them.

The ultraviolet absorber is not particularly limited. However, benzophenone derivatives and benzotriazole derivatives are suitably used. Some of these ultraviolet absorbers have a radically polymerizable unsaturated bond and are preferred because of copolymerization with the synthetic resin component.

Preferred photooxidation inhibitors include hindered phenol or hindered piperidine photooxidation inhibitors. As with the ultraviolet absorber, some of photooxidation inhibitors have a radically polymerizable unsaturated bond and are preferred because of copolymerization with the synthetic resin component.

Glass Transition Point

In the present invention, the glass transition point (Tg) of the core copolymer produced by the polymerization is −20° C. or below, preferably −20° C. to −70° C., more preferably −40° C. to −70° C. When Tg is −20° C. or below, the pressure-sensitive adhesive composition containing the synthetic resin emulsion has good tackiness.

The term "glass transition point (Tg)" refers to a temperature at which the synthetic resin particles contained in the synthetic resin emulsion causes a phase change from a hard, brittle glass state to a soft, rubbery state. In the determination of the glass transition point, the presence of an inflection point can be easily confirmed by measurement with an analyzer such as a differential scanning calorimeter (DSC). Further, regarding the glass transition point (Tg), Tg of the polymer can be easily analogized from the composition of the monomer by the following FOX's equation.

(FOX's Equation)

$$1/Tg = W_1/Tg_1 + W_2/Tg_2 + W_3/Tg_3 + \ldots + W_n/Tg_n$$
$$W_1 + W_2 + W_3 + \ldots + W_n = 1$$

wherein 1 to n represent a positive number;

$W_1$, $W_2$, $W_3$, ..., and $W_n$ respectively represent the weight fractions of the monomers; and $Tg_1$, $Tg_2$, $Tg_3$, ..., and $Tg_n$ respectively represent the glass transition points (absolute temperature) of the homopolymers.

Easily Water-swellable Pressure-sensitive Adhesive Composition

The easily water-swellable pressure-sensitive adhesive composition according to the present invention is composed mainly of the synthetic resin emulsion according to the present invention. The expression "composed mainly of" as used herein of course embraces the case where the easily water-swellable pressure-sensitive adhesive composition consists of the synthetic resin emulsion as the main component only and further embraces the case where, in addition to the synthetic resin emulsion as the main component, other optional components may be contained so far as the adhesive properties inherent in the synthetic resin emulsion are not lost. Accordingly, the easily water-swellable pressure-sensitive adhesive composition may contain various conventional auxiliary components so far as the above synthetic resin emulsion is contained as the main component.

Such auxiliary components include, for example, tackifying resins, various pigments, dyes, color pigments, thickeners, surfactants, dispersants, antifoaming agents, antifreezing agents, ultraviolet absorbers, and photooxidation inhibitors.

In incorporating these assistants in the pressure-sensitive adhesive composition, a method may be adopted in which a formulation containing these assistants (a pigment paste) is separately provided and is mixed with and incorporated in the synthetic resin emulsion.

According to the present invention, there is provided use of the synthetic resin emulsion according to the present invention, as a pressure-sensitive adhesive.

The pressure-sensitive adhesive sheet according to the present invention comprises a substrate sheet and the above easily water-swellable pressure-sensitive adhesive composition coated onto the surface of the substrate sheet.

In the present invention, the easily water-swellable pressure-sensitive adhesive composition may be coated directly on the substrate sheet to form a coating which is then dried to form a pressure-sensitive adhesive sheet or label. Alternatively, a method may be adopted in which the easily water-swellable pressure-sensitive adhesive composition is once coated onto a separator, the coating is dried, and the coated separator is then laminated onto a substrate to prepare a pressure-sensitive adhesive sheet or label.

In the present invention, substrate usable in the pressure-sensitive adhesive sheet or the like include, for example, wood free paper, coated paper, kraft paper, nonwoven fabrics, synthetic paper such as Yupo, and plastic film substrates such as PET, PP, PE, and polyvinyl chloride.

At that time, the coating is carried out by regulating a coater in such a manner that the coverage is about 15 to 25 g/m². Coaters usable herein include conventional coaters such as Komma coater, roll coater, and die coater.

The pressure-sensitive adhesive sheet or label on which the pressure-sensitive adhesive composition according to the present invention has been coated has excellent adhesive properties such as adhesion, tackiness, and cohesive force and, further, can be easily swollen with even alkali-free water, and does not cause any adhesive residue on the adherend and thus has excellent recycling efficiency.

The adherend is not particularly limited, and examples thereof include various adherends such as bottles, cans, building materials, packaging materials, materials to be packaged, electronic materials, and sanitary goods.

In another embodiment of the present invention, there is provided a bonding method comprising the step of bonding a substrate and a adherend of interest with the aid of the synthetic resin emulsion according to the present invention.

In still another embodiment of the present invention, there is provided a method for bonding a pressure-sensitive adhesive sheet, comprising the steps of: coating the above easily water-swellable pressure-sensitive adhesive composition onto the surface of a substrate sheet to form the pressure-sensitive adhesive sheet; and applying the pressure-sensitive adhesive sheet to a adherend of interest.

In a further preferred embodiment of the present invention, there is provided a method for bonding a pressure-sensitive adhesive sheet, comprising the steps of: providing the pressure-sensitive adhesive sheet according to the present invention; and applying the pressure-sensitive adhesive sheet to a adherend of interest.

In another embodiment of the present invention, there is provided a method for separating a pressure-sensitive adhesive sheet, comprising the steps of: applying water to a pressure-sensitive adhesive composition-coated part in the above pressure-sensitive adhesive sheet applied to a adherend of interest to swell the pressure-sensitive adhesive composition; and then separating the pressure-sensitive adhesive sheet, in which the pressure-sensitive adhesive composition has been swollen, from the adherend. In this embodiment, the term "water" refers to water per se and further embraces an aqueous medium containing a minor amount of a solvent such as alcohol.

EXAMPLES

The present invention is further illustrated by the following Examples that are not intended as a limitation of the invention.

Preparation of Pressure-sensitive Adhesive Compositions

Synthetic resin emulsions were prepared according to the following procedure to provide pressure-sensitive adhesive compositions.

Pressure-sensitive Adhesive Composition A1:

Deionized water (100.0 parts by weight), 3.0 parts by weight of acrylic acid, and 9.0 parts by weight of 2-hydroxyethyl acrylate were placed in a flask equipped with a thermometer, a reflux condenser, a dropping funnel, a nitrogen introduction port, and a stirrer. The contents of the flask were heated to 70° C. with stirring under a nitrogen atmosphere. Thereafter, 0.5 part by weight of ammonium persulfate (a polymerization initiator) was added thereto, and a polymerization reaction was allowed to proceed to prepare a water-soluble polymer for shell formation.

Next, a monomer mixture composed of 22.5 parts by weight of butyl acrylate, 63.5 parts by weight of 2-ethylhexyl acrylate, and 2.0 parts by weight of methacrylic acid, 0.5 part by weight of ammonium persulfate (a polymerization initiator), and 1.0 part by weight of triethanolamine were continuously added dropwise with stirring over a period of 4 hr in the presence of this water-soluble polymer for shell formation. After the completion of the dropwise addition, stirring was continued for additional 3 hr to allow the polymerization reaction to proceed and consequently to prepare a polymer as a core. Thus, a pressure-sensitive adhesive composition (pressure-sensitive adhesive composition A1), that is a synthetic resin emulsion having a core/shell structure (solid content: about 49% by weight), was prepared.

Pressure-sensitive Adhesive Composition A2:

Pressure-sensitive adhesive composition A2 was prepared in the same manner as in pressure-sensitive adhesive composition A1, except that, in the formation of the water-soluble polymer for shell formation by the polymerization, 0.1 part by weight of a compound containing an allyl group added to a benzene ring in sodium polyoxyethylene nonyl phenyl ether sulfonate (ethylene oxide: 20 moles) (polymerizable emulsifier A) was further added as an anionic polymerizable emulsifier.

Pressure-sensitive Adhesive Composition A3:

Pressure-sensitive adhesive composition A3 was prepared in the same manner as in pressure-sensitive adhesive composition A1, except that, in the formation of the polymer for the core by the polymerization in the presence of the water-soluble polymer for shell formation, the monomer mixture was brought to an emulsion monomer using 20 parts by weight of water and 0.1 part by weight of anionic polymerizable emulsifier A (a compound containing an allyl group added to a benzene ring in sodium polyoxyethylene nonyl phenyl ether sulfonate (ethylene oxide: 20 moles)), and the emulsion monomer was added dropwise.

Pressure-sensitive Adhesive Composition A4:

Pressure-sensitive adhesive composition A4 was prepared in the same manner as in pressure-sensitive adhesive composition A3, except that 5 parts by weight of methacrylic acid and 7 parts by weight of acrylamide were used as monomers for the preparation of the water-soluble polymer for shell formation instead of acrylic acid and 2-hydroxyethyl acrylate and, further, anionic polymerizable emulsifier B (a compound containing an allyl group added to a benzene ring in sodium polyoxyethylene nonyl phenyl ether sulfonate (ethylene oxide: 10 moles)) was used instead of polymerizable emulsifier A.

Pressure-sensitive Adhesive Composition A5:

Pressure-sensitive adhesive composition A5 was prepared in the same manner as in pressure-sensitive adhesive composition A3, except that 9 parts by weight of methacrylic acid and 3 parts by weight of 2-hydroxyethyl acrylate were used as the monomers for the preparation of the water-soluble polymer for shell formation instead of acrylic acid and 9.0 parts by weight of 2-hydroxyethyl acrylate and, further, polymerizable emulsifier C (a compound containing an allyl group added to a benzene ring in nonionic polyoxyethylene nonyl phenyl ether of ethylene oxide (40 moles)) was used instead of polymerizable emulsifier A.

Pressure-sensitive Adhesive Composition A6:

Pressure-sensitive adhesive composition A6 was prepared in the same manner as in pressure-sensitive adhesive composition A1, except that the monomer mixture for the preparation of the polymer for core formation was changed to a monomer mixture composed of 81 parts by weight of butyl acrylate, 2.0 parts by weight of methacrylic acid, and 5 parts by weight of methyl acrylate.

Pressure-sensitive Adhesive Composition A7:

Pressure-sensitive adhesive composition A7 was prepared in the same manner as in pressure-sensitive adhesive composition A3, except that the monomer mixture for the preparation of the polymer for core formation was changed to a monomer mixture composed of 33.5 parts by weight of butyl acrylate, 30.0 parts by weight of 2-ethylhexyl acrylate, 2.0 parts by weight of methacrylic acid, and 22.5 parts by weight of methyl acrylate.

Pressure-sensitive Adhesive Composition A8:

Pressure-sensitive adhesive composition A8 was prepared in the same manner as in pressure-sensitive adhesive composition A3, except that 5.0 parts by weight of acrylic acid and 7.0 parts by weight of hydroxyethyl methacrylate were used as the monomers for the preparation of the water-soluble polymer for shell formation instead of 3.0 parts by weight of acrylic acid and 9.0 parts by weight of 2-hydroxyethyl acrylate.

Pressure-sensitive Adhesive Composition A9:

Pressure-sensitive adhesive composition A9 was prepared in the same manner as in pressure-sensitive adhesive composition A3, except that 8.0 parts by weight of acrylic acid and 4.0 parts by weight of hydroxyethyl methacrylate were used as the monomers for the preparation of the water-soluble polymer for shell formation instead of 3.0 parts by weight of acrylic acid and 9.0 parts by weight of 2-hydroxyethyl acrylate and, further, the amount of polymerizable emulsifier A used was changed to 1.0 part by weight.

Pressure-sensitive Adhesive Composition A10:

Pressure-sensitive adhesive composition A10 was prepared in the same manner as in pressure-sensitive adhesive composition A3, except that 9.0 parts by weight of hydroxyethyl methacrylate was used as the monomer for the preparation of the water-soluble polymer for shell formation instead of 9.0 parts by weight of 2-hydroxyethyl acrylate, the monomer mixture for the preparation of the polymer for core formation was changed to a monomer mixture composed of 60.0 parts by weight of butyl acrylate, 12.0 parts by weight of 2-ethylhexyl acrylate, and 10.0 parts by weight of methacrylic acid, and, further, the emulsifier was changed to 1.0 part by weight of nonreactive emulsifier D (polyoxyethylene nonyl phenyl ether (ethylene oxide: 40 moles)).

Pressure-sensitive Adhesive Composition A11:

Pressure-sensitive adhesive composition A11 was prepared in the same manner as in pressure-sensitive adhesive composition A9, except that, in the monomers for the preparation of the water-soluble polymer for shell formation, the amount of hydroxyethyl methacrylate used was changed to 20 parts by weight and, further, the amount of triethanolamine used as the pH adjustor was changed to 1.5 parts by weight.

Pressure-sensitive Adhesive Composition A12:

Pressure-sensitive adhesive composition A12 was prepared in the same manner as in pressure-sensitive adhesive composition A1, except that, in the monomers for the preparation of the water-soluble polymer for shell formation, the amount of hydroxyethyl acrylate used was changed to 20.0 parts by weight, the monomer mixture for the preparation of the polymer for core formation was changed to a monomer mixture composed of 39.0 parts by weight of butyl acrylate, 18.0 parts by weight of 2-ethylhexyl acrylate, and 20.0 parts by weight of methacrylic acid, and, further, the amount of triethanolamine used as the pH adjustor was changed to 2 parts by weight.

Pressure-sensitive Adhesive Composition A13:

Pressure-sensitive adhesive composition A13 was prepared in the same manner as in pressure-sensitive adhesive composition A1, except that the pH adjustor used in the formation of the polymer for core formation was changed from triethanolamine to 4.0 parts by weight of 25% aqueous ammonia.

Pressure-sensitive Adhesive Composition A14:

Pressure-sensitive adhesive composition A14 was prepared in the same manner as in pressure-sensitive adhesive composition A1, except that the pH adjustor used in the formation of the polymer for core formation was changed from triethanolamine to 1.5 parts by weight of sodium hydroxide.

Pressure-sensitive Adhesive Composition B1 (Comparative Example): where Polymerization was Carried out without Formation of Polymer for Shell Formation Deionized water (80.0 parts by weight) and 0.1 part by weight of a compound containing an allyl group added to a benzene ring in sodium polyoxyethylene nonyl phenyl ether sulfonate (ethylene oxide: 20 moles) as an anionic polymerizable emulsifier (polymerizable emulsifier A) were placed in a flask equipped with a thermometer, a reflux condenser, a dropping funnel, a nitrogen introduction port, and a stirrer. The contents of the flask were heated to 70° C. with stirring under a nitrogen atmosphere. Thereafter, a monomer mixture composed of 22.5 parts by weight of butyl acrylate, 63.5 parts by weight of 2-ethylhexyl acrylate, and 2.0 parts by weight of methacrylic acid was brought to an emulsion monomer using 20.0 parts by weight of water and 0.1 part by weight of polymerizable emulsifier A. Next, this emulsion monomer, together with 0.5 part by weight of ammonium persulfate (a polymerization initiator), and 1.0 part by weight of triethanolamine, were continuously added dropwise over a period of 4 hr to the flask. After the completion of the dropwise addition, stirring was continued for additional 3 hr to allow the polymerization reaction to proceed and consequently to prepare a synthetic resin emulsion pressure-sensitive adhesive composition having a solid content of about 46% by weight (pressure-sensitive adhesive composition B1).

Pressure-sensitive Adhesive Composition B2 (Comparative Example): where Unsaturated Carboxylic Acid only was used in Formation of Polymer for Shell Formation Pressure-sensitive adhesive composition B2 was prepared in the same manner as in pressure-sensitive adhesive composition A1, except that, in the formation of the water-soluble polymer for shell formation, 100.0 parts by weight of deionized water and 12.0 parts by weight of acrylic acid were placed in the flask, the contents of the flask were heated to 70° C. with stirring under a nitrogen atmosphere, 0.5 part by weight of ammonium persulfate (a polymerization initiator) was then added thereto, and a polymerization reaction was allowed to proceed.

Pressure-sensitive Adhesive Composition B3 (Comparative Example): where Hydroxyl-containing Monomer only was used in Formation of Polymer for Shell Formation Pressure-sensitive adhesive composition B3 was prepared in the same manner as in pressure-sensitive adhesive composition A1, except that, in the formation of the water-soluble polymer for shell formation, 100.0 parts by weight of deionized water and 12.0 parts by weight of 2-hydroxyethyl methacrylate were placed in the flask, the contents of the flask were heated to 70° C. with stirring under a nitrogen atmosphere, 0.5 part by weight of ammonium persulfate (a polymerization initiator) was then added thereto, and a polymerization reaction was allowed to proceed.

Pressure-sensitive Adhesive Composition B4 (Comparative Example): where Neutralization was Carried out after Polymerization for Core Formation Pressure-sensitive adhesive composition B4 was prepared in the same manner as in pressure-sensitive adhesive composition A1, except that, in the monomers for the preparation of the water-soluble polymer for shell formation, 9 parts by weight of 2-hydroxyethyl methacrylate was used instead of 2-hydroxyethyl acrylate, and, in the formation of the core polymer, the polymerization reaction was allowed to proceed without dropwise addition of triethanolamine, and, after the completion of the polymerization reaction, pH was adjusted to 4 by the addition of 1.0 part by weight of triethanolamine.

Pressure-sensitive Adhesive Composition B5 (Comparative Example): where Neutralization was Carried out in Formation of Polymer for Shell Formation Pressure-sensitive adhesive composition B5 was prepared in the same manner as in pressure-sensitive adhesive composition A1, except that, in the formation of the water-soluble polymer for shell formation, 100.0 parts by weight of deionized water, 3.0 parts by weight of acrylic acid, and 9.0 parts by weight of 2-hydroxyethyl methacrylate were placed in the flask, the contents of the flask were heated to 70° C. with stirring under a nitrogen atmosphere, 0.5 part by weight of ammonium, persulfate (a polymerization initiator) and 1.0 part by weight of triethanolamine were then added thereto, and a polymerization reaction was allowed to proceed.

Pressure-sensitive Adhesive Composition B6 (Comparative Example):

Pressure-sensitive adhesive composition B5 was prepared in the same manner as in pressure-sensitive adhesive composition B1, except that the monomer mixture for the preparation of the polymer for core formation was changed to a monomer mixture composed of 12.0 parts by weight of 2-hydroxyethyl methacrylate, 22.5 parts by weight of butyl acrylate, 63.5 parts by weight of 2-ethylhexyl acrylate, and 2.0 parts by weight of methacrylic acid.

The formulations of the above pressure-sensitive adhesive compositions were summarized in Tables 1 and 2. In these tables, all values are in parts by weight.

TABLE 1

| | | Pressure-sensitive adhesive composition | | | | | | | | | | | | | |
|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 |
| Shell | Water | 100 | 100 | 80 | 80 | 80 | 100 | 80 | 80 | 80 | 80 | 80 | 100 | 100 | 100 |

TABLE 1-continued

| | | Pressure-sensitive adhesive composition | | | | | | | | | | | | | |
|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 |
| | AA | 3 | 3 | 3 | | | 3 | 3 | 5 | 8 | 3 | 8 | 3 | 3 | 3 |
| | MAA | | | | 5 | 9 | | | | | | | | | |
| | 2-HEMA | | | | | | | | 7 | 4 | 9 | 20 | | | |
| | 2-HEA | 9 | 9 | 9 | | 3 | 9 | 9 | | | | | 20 | 9 | 9 |
| | AM | | | | 7 | | | | | | | | | | |
| | R-SA (A) | | 0.1 | | | | | | | | | | | | |
| | Subtotal | 112.0 | 112.1 | 92.0 | 92.0 | 92.0 | 112.0 | 92.0 | 92.0 | 92.0 | 92.0 | 108.0 | 123.0 | 112.0 | 112.0 |
| Core | Water | 0 | 0 | 20 | 20 | 20 | 0 | 20 | 20 | 20 | 20 | 20 | 0 | 0 | 0 |
| | BA | 22.5 | 22.5 | 22.5 | 22.5 | 22.5 | 81 | 33.5 | 22.5 | 22.5 | 60 | 22.5 | 39 | 22.5 | 22.5 |
| | 2-EHA | 63.5 | 63.5 | 63.5 | 63.5 | 63.5 | | 30 | 63.5 | 63.5 | 12 | 63.5 | 18 | 63.5 | 63.5 |
| | MAA | 2 | 2 | 2 | 2 | 2 | 2 | 2 | 2 | 2 | 10 | 2 | 20 | 2 | 2 |
| | MA | | | | | | 5 | 22.5 | | | | | | | |
| | R-SA (A) | | | 0.1 | | | | | 0.1 | 0.1 | 1 | | 1 | | |
| | R-SA (B) | | | | 0.1 | | | | | | | | | | |
| | R-SA (C) | | | | | 0.1 | | | | | | | | | |
| | N-SA (D) | | | | | | | | | | | 1 | | | |
| | 25% Aqueous ammonia | | | | | | | | | | | | | 4 | |
| | Triethanolamine | 1 | 1 | 1 | 1 | 1 | 1 | 1 | 1 | 1 | 1 | 1.5 | 2 | | |
| | Sodium hydroxide | | | | | | | | | | | | | | 1.5 |
| | Subtotal | 89.0 | 89.0 | 89.1 | 89.1 | 89.1 | 89.0 | 89.1 | 89.1 | 90.0 | 84.0 | 90.5 | 79.0 | 92.0 | 89.5 |
| | Total | 201.0 | 201.1 | 181.1 | 181.1 | 181.1 | 201.0 | 181.1 | 181.1 | 182.0 | 176.0 | 198.5 | 202.0 | 204.0 | 201.5 |

TABLE 2

| | | Pressure-sensitive adhesive composition | | | | | |
|---|---|---|---|---|---|---|---|
| | | B1 | B2 | B3 | B4 | B5 | B6 |
| Shell | Water | 80 | 100 | 100 | 100 | 100 | 80 |
| | AA | | 12 | | | 3 | 3 |
| | MA | | | | | | |
| | 2-HEMA | | | 12 | 9 | 9 | |
| | 2-HEA | | | | | | |
| | R-SA (A) | 0.1 | | | | | 0.1 |
| | Triethanolamine | | | | | 1 | |
| | Subtotal | 80.1 | 112 | 112 | 112 | 113 | 80.1 |
| Core | Water | 20 | 0 | 0 | 0 | 0 | 20 |
| | MAA | | | | | | |
| | BA | 22.5 | 22.5 | 22.5 | 22.5 | 22.5 | 22.5 |
| | 2-EHA | 63.5 | 63.5 | 63.5 | 63.5 | 63.5 | 63.5 |
| | MAA | 2 | 2 | 2 | 2 | 2 | 2 |
| | 2-HEMA | | | | | | 12 |
| | R-SA (A) | 0.1 | | | | | 0.1 |
| | Triethanolamine | 1 | 1 | 1 | 1 | | 1 |
| | Sodium hydroxide | | | | | | |
| | Subtotal | 109.1 | 89 | 89 | 89 | 88 | 121.1 |
| | Total | 189.2 | 201 | 201 | 201 | 201 | 201.2 |

Measurement of Glass Transition Point (Tg) and pH

The glass transition point (Tg) of the core polymer part of each of the pressure-sensitive adhesive compositions thus obtained was calculated by the FOX's equation. Further, pH was also measured for the pressure-sensitive adhesive compositions.

Preparation of Pressure-sensitive Adhesive Sheets

Each of the pressure-sensitive adhesive emulsions prepared above was coated onto a 25 μm-thick PET film having a surface subjected to corona treatment (tradename: Lumirror #25, available from Toray Industries, Inc.), and the coating was dried at 100° C. for one min. Thus, a pressure-sensitive adhesive sheet was prepared for each of the pressure-sensitive adhesive compositions. In all the cases, the coverage of the pressure-sensitive adhesive composition was about 20 g/m² on a dry basis.

Evaluation Tests

The following adhesive properties were examined and evaluated for the pressure-sensitive adhesive sheets which had been prepared using pressure-sensitive adhesive compositions A1 to A12 and pressure-sensitive adhesive compositions B1 to B6. Base on the obtained data on these adhesive properties, preferred property balance for applications such as pressure-sensitive adhesive sheets was evaluated overall as adhesive property balance. The swellability of the pressure-sensitive adhesive compositions was also evaluated.

Evaluation Test a: Adhesive Strength

A pressure-sensitive adhesive sheet cut into a size of width 25 mm and length 100 mm was applied to a 2.0 mm-thick stainless steel plate (SUS 304) which had been polished with sand paper #400 (manufactured by NAGATSUKA ABRASIVE MFG.□CO.,□LTD.), and, in this state, the assembly was allowed to stand for 24 hr. Thereafter, 180-degree peel strength was measured at a peel rate of 300 mm/min in an environment of temperature 23° C. and humidity 65% RH. The peel strength was measured according to the method specified in JIS Z 0237 and was expressed in N/25 mm.

Evaluation Test b: Cohesive□Force

A pressure-sensitive adhesive sheet cut into a size of width 25 mm and length 100 mm was applied to a 2.0 mm-thick stainless steel plate (SUS 304) which had been polished with sand paper #400 so that the application area was 25 mm×25 mm. For the pressure-sensitive adhesive sheet and the stainless steel sheet, a load of 1 kg was applied in an environment of 40° C. to measure the time (min) necessary for the pressure-sensitive adhesive sheet to fall from the stainless steel plate.

Evaluation Test c: Tackiness

Tackiness (ball No.) was measured by the J. Dow rolling ball method (JIS Z 0237) with an inclined-type ball tack measuring apparatus in an environment of temperature 23° C. and RH 65%.

Evaluation of Adhesive Property Balance

The adhesive property balance was judged based on the results of measurement of evaluations a to c. The judgment was done based on the following criteria. Specifically, for the judgment of the adhesive property balance, the results obtained for the evaluation items, i.e., adhesive strength, cohesive force, and tackiness, were evaluated according to three grades, i.e., very good, good, and failure. When all the evaluation items were judged to be "very good," the adhesive property balance was regarded as very good (that is, "AA"). When even any one of the evaluation items was judged to be "good," the adhesive property balance was regarded as good (that is, "A"). Further, when even any one of the evaluation items was judged to be "failure," the adhesive property balance was regarded as failure (that is, "C"). Specifically, the adhesive property balance was judged as follows.

AA: Very good
A: Good
B: Usable in pressure-sensitive adhesive sheets
C: Failure Evaluation Test d: Water Swellability Each of the pressure-sensitive adhesive compositions was coated onto a glass plate (slide glass, manufactured by MATSUNAMI GLASS KOGYO KK) with an applicator (manufactured by YOSHIMITSU SEIKI COMPANY LIMITED) at a coverage of 20 g/m$^2$, and the coated glass plates were allowed to stand for 24 hr. Thereafter, the coated glass plates were dipped in tap water of 23° C. for one hr, and the state of swelling of each pressure-sensitive adhesive composition coating formed on the glass plate was then observed. The results were judged based on the following criteria.

A: The coating was swollen and could be easily removed.
B: The coating was partially swollen.
C: The pressure-sensitive adhesive composition coating was not swollen and could not be easily removed.

The results were as shown in Tables 3 and 4. In Tables 3 and 4, abbreviations have the following means.

AA: Acrylic acid
MAA: Methacrylic acid
2-HEMA: Hydroxyethyl methacrylate
2-HEA: 2-Hydroxyethyl acrylate
AM: Acrylamide
BA: Butyl acrylate
2-EHA: 2-Ethylhexyl acrylate
MA: Methyl acrylate
R-SA (A): Polymerizable emulsifier (reactive emulsifier) A
R-SA (B): Polymerizable emulsifier (reactive emulsifier) B
R-SA (C): Polymerizable emulsifier (reactive emulsifier) C
N-SA (D): Nonreactive emulsifier D

TABLE 3

| | | Pressure-sensitive adhesive composition | | | | | | | | | | | | |
|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 |
| | Tg of core polymer | −64 | −64 | −64 | −64 | −64 | −47 | −44 | −64 | −64 | −40 | −64 | −24 | −64 | −64 |
| | pH | 3.9 | 3.9 | 3.9 | 3.7 | 3.2 | 3.9 | 3.9 | 3.3 | 2.9 | 3.3 | 3.5 | 2.8 | 3.9 | 3.9 |
| Adhesive properties | Adhesive strength (N/25 mm) | 8.1 | 8.3 | 8.2 | 7.7 | 7.5 | 7.7 | 8.8 | 8.2 | 8.0 | 7.3 | 8.0 | 6.9 | 7.9 | 8.1 |
| | Cohesive force (min) | 88 | 76 | 82 | 120 | 220 | 118 | 95 | 121 | 98 | 77 | 98 | 132 | 90 | 77 |
| | Tackiness (ball No.) | 2 | 2 | 2 | 1 | 2 | 2 | 2 | 2 | 2 | 2 | 2 | 1 | 2 | 2 |
| | Balance | A | A | A | AA | AA | AA | A | AA | A | A | A | AA | A | A |
| | Swellability | A | A | A | A | A | A | A | A | A | A | A | A | A | A |

TABLE 4

| | | Pressure-sensitive adhesive composition | | | | | |
|---|---|---|---|---|---|---|---|
| | | B1 | B2 | B3 | B4 | B5 | B6 |
| | Tg of core polymer | −64 | −64 | −64 | −64 | −64 | −53 |
| | pH | 6.8 | 2.7 | 3.1 | 4.2 | 4.4 | 6.6 |
| Adhesive properties | Adhesive strength (N/25 mm) | 11.4 | 5.6 | 7.1 | 8.1 | 8.6 | 4.8 |
| | Cohesive force (min) | 880 | 230 | 110 | 30 | 11 | 33 |
| | Tackiness (ball No.) | 9 | <1 | 3 | 1 | 1 | <1 |
| | Balance | AA | C | A | C | C | C |
| | Swellability | C | C | C | C | A | C |

The invention claimed is:

1. A process for producing a synthetic resin emulsion comprising polymer particles having a core and shell structure, said shell including a copolymer of an unsaturated carboxylic acid and a hydrophilic comonomer, said core comprising a copolymer of a core monomer mixture including a radically polymerizable main monomer and a radically polymerizable functional monomer, said process comprising the steps of: providing an unsaturated carboxylic acid and a hydrophilic comonomer; polymerizing said unsaturated carboxylic acid and a hydrophilic comonomer in an aqueous medium to form an aqueous copolymer solution; and adding said core monomer mixture for core formation when the aqueous copolymer solution is in an unneutralized state to form a reaction mixture; concurrently emulsion polymerizing the reaction mixture and adding a pH adjuster to the aqueous copolymer solution, to form a synthetic resin emulsion, wherein said monomer mixture comprises monomers selected so that the glass transition point (Tg) of the core copolymer produced by polymerization is −20° C. or below.

2. The process for producing a synthetic resin emulsion according to claim 1, wherein, said core monomer mixture is added as an emulsion monomer solution that is prepared with an emulsifier.

3. A method for making a pressure-sensitive adhesive comprising the step of adding a synthetic resin emulsion that is prepared according to claim 1 to the pressure sensitive adhesive during formation of the pressure sensitive adhesive.

4. A process for producing a synthetic resin emulsion suitable for use in a pressure sensitive adhesive, wherein said emulsion has polymer particles with a core/shell structure, said process comprising the steps of:
   a) polymerizing an unsaturated carboxylic acid monomer and a hydrophilic comonomer in an aqueous medium to produce a shell copolymer for the shell structure of the emulsion particles, where the copolymer is in solution in the aqueous medium;
   b) combining core monomers with the aqueous medium to form a reaction mixture, and emulsion polymerizing the reaction mixture while concurrently at least partially neutralizing the shell copolymer in the aqueous medium by addition of a pH adjusting agent, to provide a synthetic resin emulsion having a core/shell structure which exhibits swelling in water without any alkali treatment, wherein said core monomers comprise radically polymerizable main monomer and a radically polymerizable functional monomer in the aqueous medium, and wherein said core monomers are selected such that the core polymer has a Tg of less than $-20°$ C.

5. The process according to claim 4, wherein shell copolymer is in an unneutralized state when the core monomers and pH adjusting agent are added to the aqueous medium.

6. The process according to claim 4, wherein the core monomers are polymerized in the reaction mixture, while the pH of the reaction mixture is held at less than 7.

* * * * *